March 7, 1950     T. W. KENYON     2,499,391
ERECTOR MECHANISM FOR GYROSCOPES

Filed March 2, 1948     3 Sheets-Sheet 1

INVENTOR.
THEODORE W. KENYON
BY Kenyon & Kenyon
ATTORNEYS

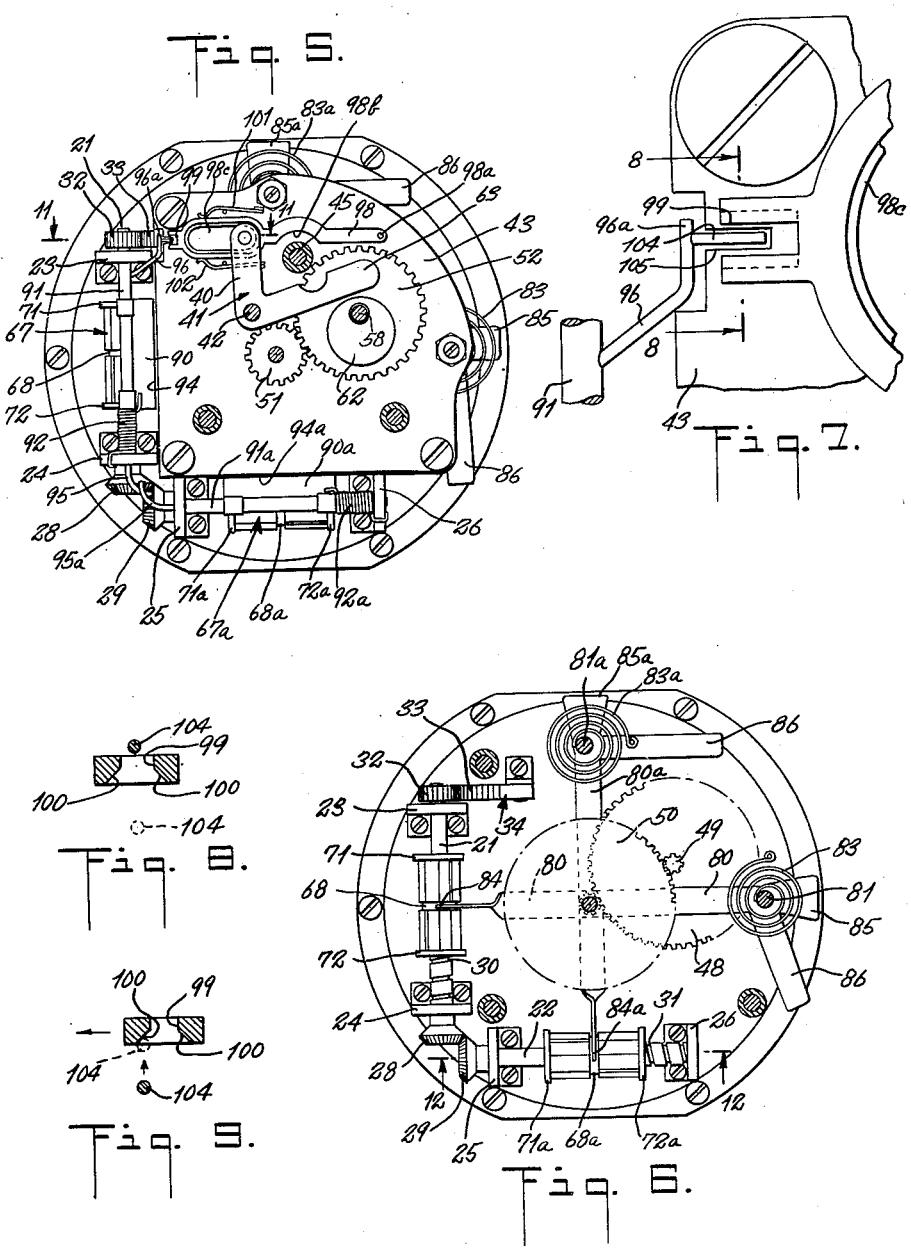

March 7, 1950 T. W. KENYON 2,499,391
ERECTOR MECHANISM FOR GYROSCOPES

Filed March 2, 1948 3 Sheets-Sheet 3

INVENTOR.
THEODORE W. KENYON
BY
Kenyon & Kenyon
ATTORNEYS

Patented Mar. 7, 1950

2,499,391

UNITED STATES PATENT OFFICE 2,499,391

ERECTOR MECHANISM FOR GYROSCOPES

Theodore W. Kenyon, Huntington, N. Y., assignor to Kenyon Gyro & Electronics Corporation, Huntington, N. Y., a corporation of New York Application March 2, 1948, Serial No. 12,503

18 Claims. (Cl. 74—5.44)

This invention relates to gyro-verticals, and more particularly to a novel erecting mechanism for use in conjunction therewith.

An object of the invention is to provide erecting mechanism useful with gyroscopes to erect the driven rotor axis to gyro-vertical and which is capable of accurate operation under forces up to and including ten times the gravitational constant (10 g.)

Another object of the invention is to provide an erector mechanism by which the gyroscope is continually kept in balance at all times by the movement of erector weights thereof.

A further object of the invention is to provide simple mechanism in conjunction with the erector mechanism to prevent actuation of operating parts of the erector mechanism during turning of a moving body or vehicle such as an airplane so that the gyro-rotor axis remains in its vertical position during execution of a turn, thereby eliminating "turn error" which is such an important factor in connection with high speed airplanes or missiles.

Another object of the invention is to embody novel damping means in the erector system in such manner that the erector mechanism will not be affected by transient accelerations.

Another object of the invention is to provide erector mechanism that can be applied to existing gyroscopes without material modification thereof.

To the accomplishment of the foregoing and such other objects as may hereinafter appear, the invention comprises the novel construction and arrangement of parts hereinafter to be described and then sought to be defined in the appended claims, reference being had to the accompanying drawings forming a part hereof, which show merely for the purposes of illustrative disclosure, a preferred embodiment of the invention, it being expressly understood, however, that changes may be made in practice within the scope of the claims without digressing from the inventive idea.

In the drawings in which similar reference characters denote corresponding parts:

Fig. 5 is a sectional view taken along line 5—5 of Fig. 2;

Fig. 6 is a sectional view taken along line 6—6 of Fig. 2;

Fig. 7 is an enlarged fragmentary plan view of the parts at the upper left corner of Fig. 5 illustrating structural details of the turn error eliminating mechanism;

Fig. 8 is a fragmentary section taken along line 8—8 of Fig. 7 showing the parts in one position of operation;

Fig. 9 is a similar sectional view showing the same parts in another position of operation;

Figure 1:
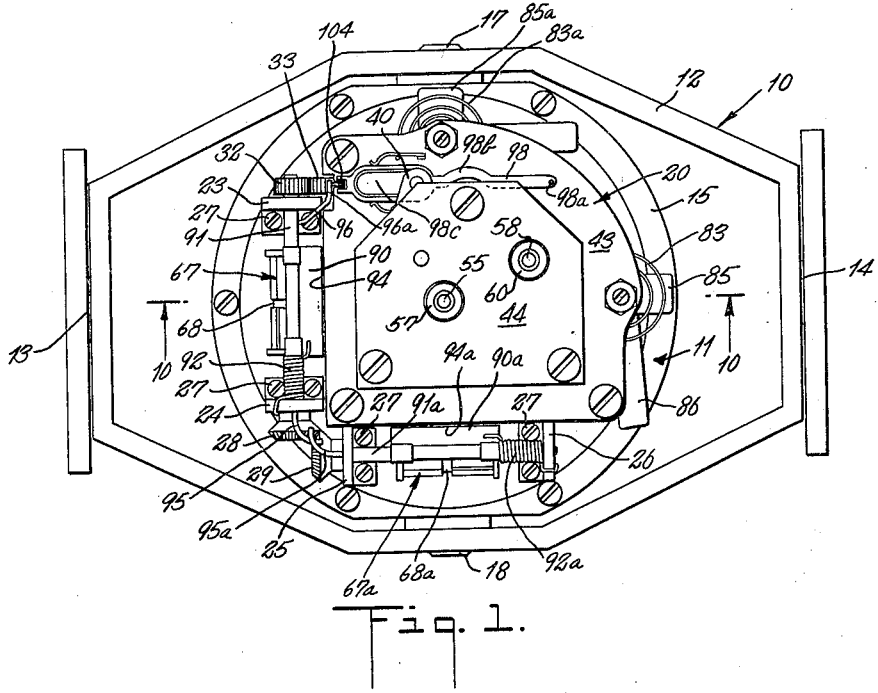
Fig. 1 is a top plan view of a gyroscope equipped with an erector mechanism embodying the invention.

Referring to the drawings, 10 denotes in its entirety a gyro-vertical construction. This gyro-vertical 10 comprises a suitably driven gyroscope 11 supported for freedom of movement about mutually perpendicular horizontal axes and in substantial neutral equilibrium through the expedient of a gimbal construction 12 supported in axially alined bearings 13, 14 for oscillatory or rotary movement about a horizontal, longitudinal major axis. The rotor bearing casing 15 [within which the gyro-rotor (not shown) is journalled so that its axis of rotation A—A is normally vertical] is supported in the gimbal ring 12 for oscillation about a horizontal axis which is perpendicular to that of the bearings 13, 14 as by the axially alined oppositely located bearings 17, 18 in said ring 12. The rotor bearing casing 15, if the rotor is electrically driven, includes a stator of the required type and, of course, the necessary commutator on the rotor shaft, and brushes (all not shown) if the gyro is a direct current type, or other necessary electrical connections (not shown) if an alternating current driven gyro is used, or the necessary parts for compressed air drive if such a type of gyro is used.

The erector mechanism constituting the invention, denoted generally by the reference character 20, is supported preferably from a plate 16 secured to the top of the rotor casing 15. This erector mechanism 20 in general comprises a pair of shafts 21 and 22 rotatably supported at right angles to each other with their axes lying in a common plane perpendicular to the axis A—A of the rotor shaft. Supports 23, 24, 25 and 26 secured to the plate 16 as by screws 27 are provided with bearings of appropriate type which serve to so support the shafts 21 and 22. The adjacent ends of the two shafts 21 and 22 are coupled by the meshing conical gears 28 and 29 keyed or otherwise fixed to the respective shafts 21 and 22 so that these two shafts will operate in synchronism. Peripheral spiral feeding grooves or threads 30 and 31 are provided on the surfaces of the respective shafts 21 and 22.

Figure 2:
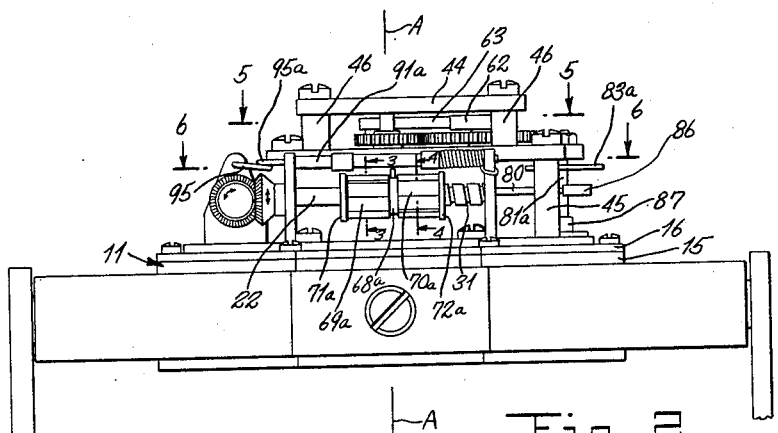
Fig. 2 is a side elevation thereof.
Figure 3:
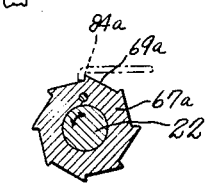
Fig. 3 is a section taken along line 3—3 of Fig. 2 and viewed in the direction of the arrows.
Figure 4:
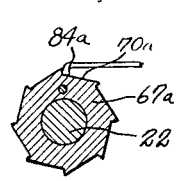
Fig. 4 is a similar view taken along line 4—4 of Fig. 2.
Figure 10:
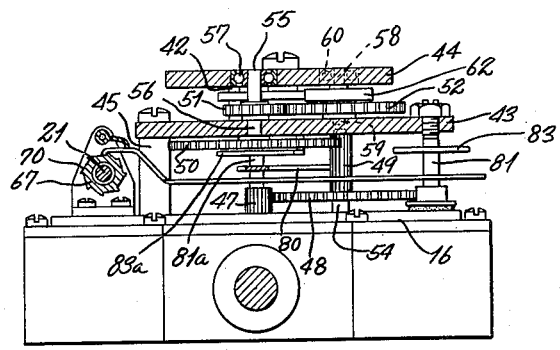
Fig. 10 is a sectional view taken along line 10—10 of Fig. 1.

A spur gear 32 is keyed or otherwise secured to the remote end of one of the two shafts, for example, shaft 21. An arcuate gear segment 33 (Fig. 11) is provided on one arm of a bell crank lever 34. This lever 34 is pivotally supported at 35 from a support 36 secured at 37 to the plate 16. A cam follower 38 is provided on another arm of the bell crank lever 34. This cam follower 38 engages an operating rod or pin 39. The rod or pin 39 depends from an arm 40 of a bell crank lever 41 (Fig. 5) which in turn is supported on a vertical shaft 42 for rotation in a plane parallel to the plane of the plate 16. The shaft 42 lies between a pair of plates 43 and 44 (Fig. 10). Plate 43 is supported on uprights 45 extending from the plate 16 and plate 44 is supported on uprights 46 extending from the plate 43 (Fig. 2).

A spur gear 47 (Fig. 10) secured to an extension of the gyro-rotor shaft (not shown) projecting upwardly of the plate 16 meshes with a larger diameter first gear 48 of a gear train. The gear train includes a gear 49 coaxial with gear 48, a gear 50 meshing with gear 49, a gear 51 coaxial with gear 50, and a gear 52 meshing with the gear 51. The opposite ends of the shaft 54 carrying the coaxial gears 48 and 49 are supported in appropriate bearings provided in the plates 16 and 43. The shaft 55 supported in bearings 56 and 57 provided in the plates 43 and 44 serves to support the coaxial gears 50 and 51 on opposite sides of the plate 43. The opposite ends of the shaft 58 carrying gear 52 are supported in appropriate bearings 59 and 60 (Fig. 10) provided in the plates 43 and 44 so as to support the gear 52 in meshing relationships with the gear 51.

An eccentric cam 62 is secured to the shaft 58 for rotation with the gear 52. The gear train coupling gears 47 and 52 act as a speed reducing train such that gear 52 and the cam 62 driven thereby rotate but a few revolutions per minute in contrast with the very high rotational speed of the rotor driven gear 47 which is of the order of many thousands of revolutions per minute.

The bell crank lever 41 has an arm 63 which extends into the path of rotation of the cam 62 and is biased toward engagement therewith, as will be described, so that rotation of cam 62 causes periodic oscillation of the arm 63 and consequently bell crank lever 41 and its shaft 42. This periodic oscillation is transmitted through arm 40 of bell crank lever 41 to the pin or rod 39. The engagement of cam follower 38 with rod 39 imparts corresponding periodic oscillation to the bell crank 34 and to its arcuate gear segment 33. Since the latter meshes with the gear 32, it thereby causes corresponding alternate rotation in opposite directions or oscillations of the shaft 21 and consequent similar synchronous rotation or oscillation of shaft 22 by reason of the meshed gears 28 and 29. The periodicity of alternate opposite rotational directions or oscillations of shafts 21 and 22 corresponds to the periodicity of the oscillations imparted to arm 63 by the cam 62. A biasing spring 65 acting against the bell crank 34 (Fig. 11) biases the latter toward its uppermost position in that figure and by interaction of cam follower 38 and pin 39 biases the arm 63 against the cam 62 to effect the described alternate opposite rotational directions of the shafts 21 and 22 during rotation of said cam 62.

Erector weights in the form of erector sleeves 67 and 67a are supported movably for longitudinal translation in either direction from centralized positions upon the respective shafts 21 and 22. The translatory longitudinal movements of these sleeves 67 and 67a upon the shafts 21 and 22 are controlled as will be presently described by the described oscillatory rotations imparted to said shafts and by additional means hereinafter to be described. Since sleeve 67 and 67a have identical construction, the sleeve 67a only will be described in detail.

Figure 12:
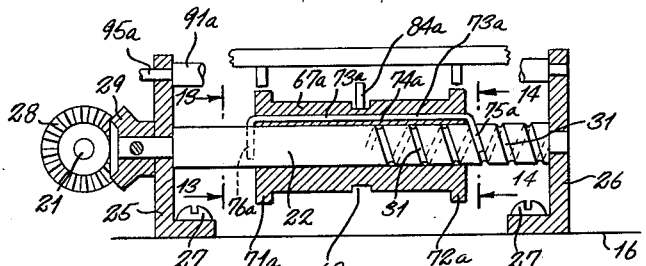
Fig. 12 is a sectional view on an enlarged scale taken along line 12—12 of Fig. 6.
Figures 13, 14:
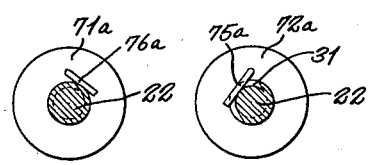
Fig. 13 is a sectional view taken along line 13—13 of Fig. 12.
Fig. 14 is a sectional view taken along line 14—14 of Fig. 12.

An annular centrally located groove or recess 68a is provided in the periphery of the sleeve 67a (Figs. 2, 3, 4 and 12). Symmetrical, oppositely directed sets of wide ratchet teeth 69a and 70a (Figs. 3 and 4) are provided on the surface of the sleeve 67a on opposite sides of the centralized groove 68a. The outer ends of the sleeve 67a are provided with annular lateral flanges 71a and 72a upstanding from the surface of the sleeve 67a. A longitudinally extending hole 73a is provided in the sleeve 67a. A spring or torsion rod 74a extends through the hole 73a and outwardly at the opposite ends of said hole. One end 75a of the rod 74a is bent angularly to engage in the spiral groove or thread 31 of shaft 22 (Figs. 12 and 14). The opposite end 76a of the rod 74a is bent laterally and the rod 74a twisted or torsioned to cause the bent end 76a to engage the peripheral surface of the shaft 22 (Figs. 12 and 13). The twisting or torsioning of rod 74a causes frictional engagement of its respective ends 75a and 76a in groove 31 and on the surfaces of shaft 22 so that a friction coupling exists between shaft 22 and sleeve 67a. Thus the latter normally executes the same previously described rotary oscillatory movements imparted to shaft 22 unless the sleeve is restrained from rotation by means to be described. In the event of such restraint, the engagement of end 75a in spiral groove or thread 31 causes longitudinal translation of the sleeve 67a on shaft 22 in a direction depending upon the direction of rotation of shaft 22 during the period of rotational restraint of the sleeve. Similar parts numbered 67 to 76 on the sleeve 67 that is mounted on shaft 21 have identical construction.

Restraining means for acting independently on the sleeves 67 and 67a are provided. In the embodiment shown, such means comprise flexible fingers or arms 80 and 80a (Figs. 6 and 10). These arms 80 and 80a are supported respectively on pintles 81 and 81a positioned at points 90° apart in bearings 82, 82a provided on plate 43 and in similar bearings provided on the plate 16. Centralizing springs 83 and 83a resembling watch hair springs have their opposite ends connected respectively to fixed points and to the respective pintles 81 and 81a. These springs 83 and 83a act to maintain the arms 80 and 80a normally in centralized positions and crossed substantially at right angles to each other as seen in Fig. 6. Pawl-like members 84 and 84a are provided on the outer ends of arms 80 and 80a which, in some positions of the arms 80 and 80a and of sleeves 67 and 67a, will lie alined with and be movable into the annular recesses 68 and 68a of the respective sleeves 67 and 67a.

Unbalanced weights 85, 86 and 85a, 86a are secured to the respective arms 80 and 80a or to their pintles 81 and 81a to cause a swinging movement of the respective pintles 81 and 81a and the arms 80 and 80a thereof whenever the gyro-rotor axis A—A deviates from vertical. The direction of such swings will depend upon the angle and direction of tilt or deviation. Damping means 87 (Fig. 2) of desirable kind, for example, the viscous damping means described in my co-pending application, Serial No. 746,995, now Patent No. 2,464,516, is provided for each pintle 81 and 81a. This damping means acts to inhibit or minimize the effects of transient accelerations and to average the forces caused by gyro-vertical deviations acting to swing the arms 80 and 80a.

The arms 80 and 80a are positioned so that their pawls 84 and 84a normally clear the surfaces of the sleeves 67 and 67a so that they are free to swing in parallel planes parallel to the common plane of the shafts 21 and 22 upon deviations from the vertical of the gyro axis A—A in response to the actions of the unbalanced weights 85, 86, 85a and 86a, as limited by the damping means 87 and the restoring springs 83 and 83a.

Depressing means are provided to move the pawls 84 and 84a downwardly into engagement with respective surfaces of the sleeves 67 and 67a. These depressing means comprise plates 90 and 90a (Figs. 1, 2, 5 and 10) which are supported on shafts 91 and 91a pivotally carried between respective pairs of the supports 23, 24 and 25, 26. Biasing springs 92, 92a act normally to tend to press the outer edges 94, 94a of the plates 91 and 91a against portions of the respective arms 80 and 80a to engage their pawls 84 and 84a with the respective surfaces of sleeves 67 and 67a. Interengaging extensions 95, 95a of the adjacent ends of shafts 91 and 91a serve to provide corresponding rotation of the shafts 91, 91a in opposition to the biasing springs 92 and 92a at appropriate times as will be described.

Figure 11:
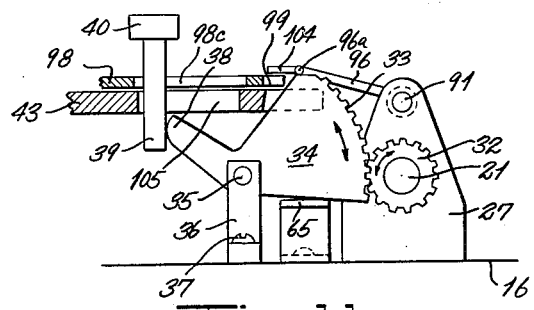
Fig. 11 is a sectional view taken along line 11—11 of Fig. 5.

An extension rod 96 (Figs. 1, 5, 7 and 11) secured to shaft 91 has an end portion 96a that normally overlies and engages the upper edge of the segmental gear 33 so that when the latter is in its uppermost position shown in Fig. 11 to which it is normally biased by the leaf spring 65, the shaft 91 and also shaft 91a because of the interengaging extensions 95, 95a are rotated in opposition to the respective biasing springs 92 and 92a. This normally maintains the edges 94 and 94a of plates 90 and 90a clear of any engagement with the arms 80 and 80a and hence the respective pawls 84 and 84a are then out of engagement with the sleeves 67 and 67a. Under such conditions the arms 80 and 80a are free to swing with their pintles 81 and 81a and the respective sleeves 67, 67a to rotate with their shafts 21 and 22 as previously described.

To eliminate turn error it is necessary to provide means that will maintain the pawls 84 and 84a of arms 80 and 80a out of contact with the pawls 69, 70, 69a or 70a of the sleeve 67 and 67a while the vehicle is executing a turn so that the pawls will not act upon the sleeves 67 and 67a at such times. Simple turn error eliminating means to effect this result are provided. Such means comprises an arm 98 (Figs. 1 and 5) pivotally supported at 98a for oscillation in a plane perpendicular to the axis of the gyro-rotor and, for example, from the plate 43. This arm 98 is recessed or bent at 98b for clearance relative to the upright 45 so that the latter will not interfere with necessary oscillation of the arm 98. A wide slot 98c is provided in the arm 98 through which the pin 39 passes (Fig. 11). This slot 98c is wide enough to permit necessary oscillation of the arm 98. A longitudinally extending slot 99 (Fig. 7) is provided in the free end of the arm 98. This slot 99 has oppositely tapered faces 100, 100a at the bottom face of arm 98 (Figs. 8 and 9) forming a widened portion for the slot 99. A pair of oppositely directed pre-loaded springs 101, 102 acting on opposite side faces of the arm 98 serve to bias or center the arm 98 in a determined position. The arm 98 is displaceable in an oscillatory manner on its pivot 98a in opposition to either of the springs 101 or 102 and to either side of its determined or centered position under the action of forces created on the execution of turns by a moving body or vehicle bearing the mechanism so far described.

An extension pin or rod 104 is secured to the portions 96a of the rod or member 96 to extend in a direction parallel with the slot 99, so as to be movable freely through the latter and an alined slot 105 in the plate 43 when the arm 98 is in its described centered or centralized position. Normally such extension pin or rod 104 is maintained at a level above the level of the upper face of arm 98 because of the biasing action of leaf spring 65 upon the gear segment 33 (Fig. 11) which, in turn, acts upon the extension 96a of the rod 96 as described hereinabove. In the executions of turns, however, the arm 98 will swing to the right or left of its centralized position on its pivot 98a depending upon directions of such turns, to misaline the slot 99 sufficiently relative to extension 104 that a portion of the arm 98 adjacent one or the other side of the slot 99 will underlie the extension 104 and inhibit or prevent its downward movement. Such action will inhibit or prevent the biasing springs 92 and 92a from swinging their respective plates 90 and 90a and their edges 94 and 94a into pressing engagement with portions of the arms 80 and 80a and leave the latter free to swing and thus satisfy the requirements of a turn error eliminating means as specified hereinabove.

Should the rod or element 104 happen to be in a lowered position as seen in Fig. 9 at the time the turn error arm 98 and its slot 99 are swung by a turn of the vehicle, the return stroke of the rod or element 104 will not be impeded, for in such return stroke it will engage one or the other of the tapered faces 100, 100a and the camming action resulting from such engagement will swing the arm 98 on its pivot 98a sufficiently to permit rod 104 to pass upwardly through slot 99 to the upper side of arm 98. The latter, assuming that the turn is still occurring, will immediately be swung again to its described locking position and preclude further downward movement of rod 104 through slot 99 until the turn has been completed and the arm 98 returned to its centered position by the action of the springs 101 and 102.

Operation of the erecting mechanism is as follows:

Assuming forward motion of the vehicle or body carrying the mechanism, the gyro-rotor driven and the sleeves 67 and 67a positioned or centralized on their shafts 21 and 22 as seen in Fig. 6 so that pawls 84 and 84a are alined with the respective annular recesses 68 and 68a of the said centralized sleeves, the gear train including gears 48, 49, 50 and 51 driven by the gyro-rotor shaft mounted gear 47, drives the gear 52 and with it the eccentric 62. The latter periodically oscillates the arm 63 of the bell crank 41. This oscillation, in turn, is transmitted through pin 39 and cam 38 to bell crank 34 so that gear segment 33 is oscillated periodically about its pivotal support 35. The gear 32 which meshes with segment 33 is thus rotated alternately in opposite directions or oscillated through about 180° in each direction. As a result, both shaft 21 and shaft 22 coupled to shaft 21 through gears 28 and 29 are similarly rotated or oscillated in synchronism. The erector weights or sleeves 67 and 67a on the respective shafts rotate or oscillate in similar manner as their shafts because of the slip friction coupling provided by the rod ends 76a and 75a of sleeve 67a and similar rod ends of sleeve 67 so that no longitudinal or translatory movement of the sleeves on their shafts occurs.

Each time the segmental gear 33 is returned by the biasing spring 97 to its uppermost position shown in Fig. 11, the rod 96 is actuated to release position so that arms 80 and 80a are released by plates 90 and 90a and are free to swing with their pintles 81 and 81a. Periodic downward movement of segmental gear 33, as described, releases rod 96 and causes the biasing springs 92 and 92a to act periodically to press the edges 94, 94a of plates 90, 90a against the respective arms or sensitive elements 80 and 80a and to press the pawls 84 and 84a of the latter onto the respective surfaces of erector weights or sleeves 67 and 67a at whatever positions the pawls 84 and 84a happen to be lying over said sleeves at such time. If for example, the pawl 84a happens to overlie the portion of sleeve bearing ratchet teeth 70a caused by a swing of arm 80a to the right in Fig. 6, while the pawl 84 has remained stationary and overlies the groove 68, the downward pressure exerted by the edges 94 and 94a of the respective plates 90 and 90a will press pawl 84a against the surface of sleeve 67a over the position bearing ratchet teeth 70a and simply press pawl 84 into groove 68. In consequence, sleeve 67 will not move along shaft 21. Pawl 84a, however, will ride over teeth 70a in one direction of rotation of shaft 22 and sleeve 67a but will engage one of the ratchet teeth 70a in the opposite rotation of shaft 22, and at such time lock the sleeve against rotation. This will cause a longitudinal translation or movement of the sleeve 67a on shaft 22 in an erecting direction because of the feeding action of spiral groove 31 on the rod end 75a (Fig. 12). The flanges 71, 72, 71a and 72a on the sleeves prevent the pawls from riding off the outer ends of the respective sleeves 67 and 67a. Similar longitudinal translations in appropriate directions of either of the sleeves 67 or 67a will occur upon any right or left shifts or movements of the pawls 84 or 84a caused by corresponding shifts or swings of their carrying arms or sensitive elements 80 or 80a. These shifts or swing movements of arms 80 or 80a are effected by the respective unbalanced weights 85, 86, 85a, 86a periodically while arms 80 or 80a are free to swing, as a result of deviations from the vertical of the gyro-rotor axis A—A. The extent of swing is averaged by the damping means 87 on the pintles 81 and 81a in accord with the extent of deviation from the vertical of the said rotor axis A—A. The damping means 87 also minimize or inhibit the effects of transient accelerations on the position of such arms 80 and 80a.

The longitudinal displacements of the sleeves 67 and 67a acting as erector weights on their respective shafts from centralized or balanced positions which are effected as just described are always in directions to cause a counter precessional movement or erecting action on the gyro to restore its rotor axis to substantially vertical or initial erect position. The movement of each erector weight or sleeve 67 or 67a continues in such an erecting direction until sufficient precessional action has been effected by its unbalanced position thereon to begin precessional restoring movements of the gyro-rotor axis A—A. When this occurs the unbalanced weights 85, 86, 85a, 86a move the arms 80 and 80a in opposite directions from that to which they have been moved to cause periodic interaction of their pawls 84 and 84a with the oppositely directed ratchet teeth 69, 70, 69a and 70a on the respective sleeves 67 and 67a and thereby effect return longitudinal movement of the said sleeves 67 and 67a toward their initial centered or centralized positions which positions are achieved substantially shortly after the gyro-rotor axis A—A has been returned to its normal vertical position. Briefly the periodic controlling interaction of the pawls 84 and 84a with the oppositely directed ratchet teeth 69, 70, 69a and 70a of the respective shaft borne rotatable erector weights or sleeves 67 and 67a causes longitudinal translation of these weights from centralized or balanced positions on the respective shafts 21 and 22 in necessary directions to cause precessional erecting action created by unbalanced or off centralized positions of such erector weights, and a restoration of said weights or sleeves toward initial centralized or balanced positions substantially when erecting action has been completed and the gyro-rotor axis A—A has been restored to vertical.

During execution of turns, the turn error arm 98 and its associated components act as described hereinabove to preclude pressing engagement and action of the pawls 84 and 84a on the ratchet teeth 69, 70, 69a and 70a of the respective erector weights or sleeves 67 and 67a. The arm 98 becomes inactive immediately upon completion of the turn under positioning control of the preloaded springs 101 and 102 as described and the erecting mechanism is then again free to act.

The speed of rotation of the eccentric 62 is made sufficient through the gear train connecting gears 47 and 52 to insure sufficiently frequent oscillations of gear segment 33 and periodic, alternate engagement and clearance of the pawls 84 and 84a with the ratchet teeth 69, 70, 69a and 70a, as the case may be, to provide the described translatory movements of the erector weights or sleeves 67 and 67a on their shafts 21 and 22 necessary for substantially continual gyro-vertical erecting control of the axis A—A of the gyro-rotor. Since the erecting weights 67 and 67a require positive interaction therewith of the pawls 84 and 84a for required translations on their shafts 21 and 22, transient accelerations have no material effects. Moreover, other inaccuracies are prevented which are likely to occur when the vehicle carrying the described erecting mechanism travels at high speeds and provides forces up to ten times the gravitational constant (10 g.).

The structure disclosed is comparatively simple mechanically and entirely effective for the intended purposes. It provides an effective erector mechanism whereby the gyroscope is continually operated to balance it to gyro-vertical at all times and wherein turn error is eliminated.

While a specific embodiment of the invention

What is claimed is:

1. Erector mechanism for erecting the axis of the driven rotor of a gyroscope to gyro-vertical comprising a pair of erector weights positioned at centralized positions for movements at right angles relative to each other, means driven by said rotor for moving said weights, and means responsive to deviation of the gyroscope axis from gyro-vertical positions to effect interaction between said weight moving means and said weights to cause the latter to be moved at right angles relative to each other and independently from their centralized positions to gyro-erecting positions.

2. Erector mechanism for maintaining gyro-vertical of the axis of a driven gyroscope rotor comprising a pair of shafts mounted at right angles to each other in a plane perpendicular to the rotor axis, driving means for oscillating the two shafts, erector weights, one mounted on each of said shafts, and shifting means for causing movement of each weight independently along its oscillating shaft in an erecting direction in response to deviations of the rotor axis from gyro-vertical position.

3. Erector mechanism for maintaining gyro-vertical of the axis of a driven gyroscope rotor comprising a pair of shafts mounted at right angles to each other in a plane perpendicular to the rotor axis, driving means for oscillating the two shafts simultaneously, a gear train coupling said driven rotor to said driving means, erector weights, one mounted on each of said shafts, and shifting means for causing movement of each weight independently along its oscillating shaft in an erecting direction in response to deviations of the rotor axis from gyro-vertical position.

4. Erector mechanism for maintaining gyro-vertical of the axis of a driven gyroscope rotor comprising a pair of shafts mounted at right angles to each other in a plane perpendicular to the rotor axis, driving means for oscillating the two shafts, erector weights, one mounted on each of said shafts, each shaft having a spiral groove, frictional means coupling each weight with the spiral groove on its supporting shaft and also to its shaft to cause simultaneous similar oscillation of each weight with the oscillation of its supporting shaft, oppositely directed ratchet teeth on each weight and separate pawl means each having positional responses in accord with deviations of the rotor axis from gyro-vertical position for engagement with the said ratchet teeth on a different one of said weights for preventing rotary movement of such weights in required direction and thereby causing longitudinal translations of the weights along their shafts by the actions of the spiral grooves on the respective frictional means coupled therewith.

5. In a device as per claim 4, arms to each of which one of said pawl means is attached and means connected with said arms to cause the latter to swing independently in response to deviations of said rotor axis from gyro-vertical positions.

6. In a device as per claim 5, centralizing springs for returning said arms to centralized positions, and damping means for averaging swing of said arms.

7. In a device as per claim 4, spring-biased means for periodically pressing said pawl means into engagement with the ratchet teeth on respective of said weights during rotary oscillations of said shafts.

8. In a device as per claim 7, turn error eliminating means for inhibiting action of said spring-biased means during the execution of turns by a moving body carrying said erector mechanism.

9. In a device as per claim 7, a projection on said spring-biased means, and a normally centralized arm engageable with said projection in non-centralized positions effected during execution of turns by a moving body carrying said erector mechanism to inhibit said pressing action of said spring-biased means during such turn executions.

10. In a device as per claim 2 in which said shifting means includes a threaded portion, a member secured to each weight for engagement frictionally with such a threaded portion on each shaft, ratchet teeth on each weight, pawl-carrying arms whose pawls are engageable one with the ratchet teeth of each one of said weights, and periodically operated means for pressing the pawls into such engagement.

11. In a device as per claim 10, turn error eliminating means for inhibiting the action of the periodically operated means during the executions of turns by a moving body carying said erector mechanism.

12. In a device as per claim 1, turn error eliminating means for said mechanism.

13. Erector mechanism for erecting the axis of the driven rotor of a gyroscope to gyro-vertical comprising a pair of sleeve-like erector weights each having symmetrically disposed oppositely directed sets of ratchet teeth, a pair of rotatable shafts positioned at right angles to each other in a common plane perpendicular to the rotor axis on each of which one of said weights is mounted for longitudinal movement relative to a centralized position, gear train means for periodically oscillating the two shafts synchronously on their respective axes, each shaft having a spiral groove, frictional means connecting each sleeve to the spiral groove of the shaft on which it is mounted to effect longitudinal movement of the sleeves relative to their shafts whenever the sleeves are held against rotation with their shafts, pawl-bearing swingable arms swingable in planes parallel to the said common plane, whose pawls are each engageable respectively with the sets of ratchet teeth on a different sleeve, and spring-biased means operable to press the pawls into engagement with underlying ratchet teeth of the sleeves periodically during oscillating rotation of the shafts and thereby to effect said longitudinal movement of said sleeves on their shafts.

14. In a device as per claim 13, turn error eliminating means comprising an arm engageable with a portion of said spring-biased means during executions of turns by a moving body carrying said mechanism to then preclude pressing operation of said spring-biased means upon said pawls.

15. Erector mechanism for maintaining gyro vertical of the axis of a driven gyroscope rotor comprising a pair of shafts mounted at right angles to each other in a plane perpendicular to the rotor axis, each shaft having a threaded portion, driving means for oscillating the two shafts, erector weights, one mounted for longitudinal translation on each of said shafts, a member secured to each weight for engagement frictionally with the threaded portion of the shaft upon which the weight is mounted so that normally each weight oscillates with the shaft on which it is mounted, ratchet teeth on each weight, pawl-carrying swingable arms whose pawls are engageable one with the ratchet teeth of each one of said weights, and periodically operable means for pressing the pawls into such engagement to then restrain oscillation of the weights with the shafts on which they are mounted, thereby causing the frictional means of the weights while the weights are restrained to interact with the threaded portions of the shafts to effect longitudinal translation of the weights on their shafts.

16. Erector mechanism for erecting the axis of the driven rotor of a gyroscope to gyro vertical comprising a pair of erector sleeves each having symmetrically disposed oppositely-directed sets of ratchet teeth on its surface separated by a centralized recess, a pair of rotatable shafts positioned at right angles to each other in a common plane perpendicular to the rotor axis on each of which one of said weights is mounted for longitudinal movement relative to a centralized position, gear train means driven by the rotor for periodically oscillating the two shafts on their respective axes, each shaft having a spiral groove, frictional means connecting each sleeve to the spiral groove of the shaft on which it is mounted to effect longitudinal movement of the sleeves relative to their shafts whenever said sleeves are held against rotation with their shafts, pawl-bearing swingable arms swingable in planes parallel to said common plane whose pawls overlie and are engageable respectively with the sets of ratchet teeth on a different sleeve on opposite sides of the centralized recess of the sleeve, spring-biased means operable periodically during oscillating rotation of the shafts to press the pawls into engagement with those ratchet teeth of the sleeves underlying the pawls whenever the spring-biased means are operated and thereby to effect said longitudinal movement of said sleeves on their shafts, and means to control the periodicity of operation of said spring-biased means.

17. Erector mechanism for erecting the axis of the driven rotor of a gyroscope to gyro vertical comprising a pair of erector sleeves positioned at centralized positions for movements at right angles relative to each other, oppositely directed sets of ratchet teeth on each sleeve, means driven by said rotor for moving said sleeves and means responsive to deviation of the gyroscope axis from gyro vertical positions and including pawl-carrying swingable arms whose pawls are engageable one with each of the sets of ratchet teeth of a different sleeve to effect interaction between said sleeve moving means and said sleeves to cause the latter to be moved at right angles to each other and independently from their centralized positions to gyro-erecting positions.

18. A device as per claim 17 in which the oppositely directed sets of ratchet teeth on each sleeve are separated by a centralized recess and in which the outer ends of each of the sleeves have laterally extending annular flanges.

THEODORE W. KENYON.

REFERENCES CITED

The following references are of record in the file of this patent:

UNITED STATES PATENTS

| Number    | Name   | Date          |
|-----------|--------|---------------|
| 1,405,807 | Tanner | Feb. 7, 1922  |
| 2,434,488 | Dolude | Jan. 13, 1948 |

FOREIGN PATENTS

| Number  | Country | Date          |
|---------|---------|---------------|
| 349,208 | Italy   | June 9, 1937  |